(12) United States Patent
Kordosh

(10) Patent No.: US 9,592,527 B2
(45) Date of Patent: *Mar. 14, 2017

(54) SPRAY TEXTURE MATERIAL COMPOSITIONS, SYSTEMS, AND METHODS WITH ACCELERATED DRY TIMES

(71) Applicant: Homax Products, Inc., Bellingham, WA (US)

(72) Inventor: John Kordosh, Imperial Beach, CA (US)

(73) Assignee: PPG Architectural Finishes, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,093

(22) Filed: Jun. 10, 2016

(65) Prior Publication Data

US 2016/0279669 A1 Sep. 29, 2016

Related U.S. Application Data

(63) Continuation of application No. 14/452,254, filed on Aug. 5, 2014, now Pat. No. 9,382,060, which is a
(Continued)

(51) Int. Cl.
*B65D 83/00* (2006.01)
*B05D 1/02* (2006.01)
(Continued)

(52) U.S. Cl.
CPC ............ *B05D 1/02* (2013.01); *B05D 5/02* (2013.01); *B65D 83/30* (2013.01); *B65D 83/32* (2013.01); *B65D 83/48* (2013.01); *B65D 83/752* (2013.01)

(58) Field of Classification Search
CPC ...... B65D 83/30; B65D 83/752; B65D 83/48; B05D 5/02; B05D 1/02; B05D 1/3073; E04F 13/00; C09D 5/28
(Continued)

(56) References Cited

U.S. PATENT DOCUMENTS 208,330 A 9/1878 Palmer
351,968 A 11/1886 Derrick
(Continued)

FOREIGN PATENT DOCUMENTS

CA 770467 10/1967
CA 976125 10/1975
(Continued)

OTHER PUBLICATIONS

ASTM,"Standard Test Method for Conducting Cyclic Potentiodynamic Polarization Measurements for Localized Corrosoin Susceptibility of Iron-, Nickel-, or Cobalt-Based Alloys", 1993, p. 238-242.
(Continued)

*Primary Examiner* — Patrick M Buechner
*Assistant Examiner* — Robert Nichols, II
(74) *Attorney, Agent, or Firm* — Michael R. Schacht

(57) ABSTRACT

A system for dispensing texture material in an orange peel pattern has an aerosol dispenser and a contained material. The aerosol dispenser is a container assembly, a valve assembly, and an outlet assembly. The contained material is texture material and propellant material. The texture material comprises water as a solvent/carrer, latex binder, fillers, and drier accelerant. The outlet assembly alters the cross-sectional of the outlet opening to correspond to a desired orange peel texture pattern. The valve assembly allows the propellant material to force at least a portion of the texture material out of the outlet opening in a spray pattern corresponding to the desired orange peel texture pattern. The drier accelerant promotes drying of the dispensed texture material.

19 Claims, 2 Drawing Sheets

Related U.S. Application Data continuation of application No. 13/562,033, filed on Jul. 30, 2012, now abandoned, which is a continuation of application No. 12/080,671, filed on Apr. 4, 2008, now abandoned.

(60) Provisional application No. 60/922,117, filed on Apr. 5, 2007.

(51) Int. Cl.
  *B65D 83/30* (2006.01)
  *B65D 83/48* (2006.01)
  *B65D 83/14* (2006.01)
  *B65D 83/32* (2006.01)
  *B05D 5/02* (2006.01)

(58) Field of Classification Search
  USPC .......... 222/1, 402.1, 394; 239/546, 337; 524/315, 113
  See application file for complete search history.

(56) References Cited

U.S. PATENT DOCUMENTS

| | | |
|---|---|---|
| D25,916 S | 8/1896 | Woods |
| 568,876 A | 10/1896 | Regan |
| 579,418 A | 3/1897 | Bookwalter |
| 582,397 A | 5/1897 | Shone |
| 658,586 A | 9/1900 | Reiling |
| 930,095 A | 8/1909 | Seagrave |
| 931,757 A | 8/1909 | Harmer |
| 941,671 A | 11/1909 | Campbell |
| 1,093,907 A | 4/1914 | Birnbaum |
| 1,154,974 A | 9/1915 | Custer |
| 1,486,156 A | 3/1924 | Needham |
| 2,217,188 A | 8/1938 | Schellin et al. |
| 2,149,930 A | 3/1939 | Plastaras |
| D134,562 S | 12/1942 | Murphy |
| 2,307,014 A | 1/1943 | Becker et al. |
| 2,320,964 A | 6/1943 | Yates |
| 2,353,318 A | 7/1944 | Scheller |
| 2,388,093 A | 10/1945 | Smith |
| 2,530,808 A | 11/1950 | Cerasi |
| 2,565,954 A | 8/1951 | Dey |
| 2,612,293 A | 9/1952 | Michel |
| 2,686,652 A | 8/1954 | Carlson et al. |
| 2,723,200 A | 11/1955 | Pyenson |
| 2,763,406 A | 9/1956 | Countryman |
| 2,764,454 A | 9/1956 | Edelstein |
| 2,785,926 A | 3/1957 | Lataste |
| 2,790,680 A | 4/1957 | Rosholt |
| 2,831,618 A | 4/1958 | Soffer et al. |
| 2,839,225 A | 6/1958 | Soffer et al. |
| 2,908,446 A | 10/1959 | Strouse |
| 2,932,434 A | 4/1960 | Abplanalp |
| 2,965,270 A | 12/1960 | Soffer et al. |
| 2,968,441 A | 1/1961 | Holcomb |
| 2,976,897 A | 3/1961 | Beckworth |
| 2,997,243 A | 8/1961 | Kolb |
| 3,083,872 A | 4/1963 | Meshberg |
| 3,107,059 A | 10/1963 | Frechette |
| 3,167,525 A | 1/1965 | Thomas |
| 3,191,809 A | 6/1965 | Schultz et al. |
| 3,196,819 A | 7/1965 | Lechner et al. |
| 3,198,394 A | 8/1965 | Lefer |
| 3,216,628 A | 11/1965 | Fergusson |
| 3,246,850 A | 4/1966 | Bourke |
| 3,258,208 A | 6/1966 | Greenebaum, II |
| 3,284,007 A | 11/1966 | Clapp |
| 3,314,571 A | 4/1967 | Greenebaum, II |
| 3,317,140 A | 5/1967 | Smith |
| 3,342,382 A | 9/1967 | Huling |
| 3,346,195 A | 10/1967 | Groth |
| 3,373,908 A | 3/1968 | Crowell |
| 3,377,028 A | 4/1968 | Bruggeman |
| 3,390,121 A | 6/1968 | Burford et al. |
| 3,405,845 A | 10/1968 | Cook et al. |
| 3,414,171 A | 12/1968 | Grisham et al. |
| 3,415,425 A | 12/1968 | Knight et al. |
| 3,425,600 A | 2/1969 | Abplanalp |
| 3,428,224 A | 2/1969 | Eberhardt et al. |
| 3,433,391 A | 3/1969 | Krizka et al. |
| 3,450,314 A | 6/1969 | Gross |
| 3,467,283 A | 9/1969 | Kinnavy |
| 3,472,457 A | 10/1969 | McAvoy |
| 3,482,738 A | 12/1969 | Bartels |
| 3,513,886 A | 5/1970 | Easter et al. |
| 3,514,402 A | 5/1970 | Freed |
| 3,544,258 A | 12/1970 | Presant et al. |
| 3,548,564 A | 12/1970 | Bruce et al. |
| 3,550,861 A | 12/1970 | Teson |
| 3,575,319 A | 4/1971 | Safianoff |
| 3,592,359 A | 7/1971 | Marraffino |
| 3,596,835 A | 8/1971 | Smith et al. |
| 3,608,822 A | 9/1971 | Berthoud |
| 3,613,954 A | 10/1971 | Bayne |
| 3,648,932 A | 3/1972 | Ewald et al. |
| 3,653,558 A | 4/1972 | Shay |
| 3,698,645 A | 10/1972 | Coffey |
| 3,700,136 A | 10/1972 | Ruekberg |
| 3,703,994 A | 11/1972 | Nigro |
| 3,704,811 A | 12/1972 | Harden, Jr. |
| 3,704,831 A | 12/1972 | Clark |
| 3,705,669 A | 12/1972 | Cox et al. |
| 3,711,030 A | 1/1973 | Jones |
| 3,764,067 A | 10/1973 | Coffey et al. |
| 3,770,166 A | 11/1973 | Marand |
| 3,773,706 A | 11/1973 | Dunn, Jr. |
| 3,776,470 A | 12/1973 | Tsuchiya |
| 3,776,702 A | 12/1973 | Chant |
| 3,777,981 A | 12/1973 | Probst et al. |
| 3,788,521 A | 1/1974 | Laauwe |
| 3,795,366 A | 3/1974 | McGhie et al. |
| 3,799,398 A | 3/1974 | Morane et al. |
| 3,806,005 A | 4/1974 | Prussin et al. |
| 3,811,369 A | 5/1974 | Ruegg |
| 3,813,011 A | 5/1974 | Harrison et al. |
| 3,814,326 A | 6/1974 | Bartlett |
| 3,819,119 A | 6/1974 | Coffey et al. |
| 3,828,977 A | 8/1974 | Borchert |
| 3,848,778 A | 11/1974 | Meshberg |
| 3,862,705 A | 1/1975 | Beres et al. |
| 3,871,553 A | 3/1975 | Steinberg |
| 3,891,128 A | 6/1975 | Smrt |
| 3,912,132 A | 10/1975 | Stevens |
| 3,913,803 A | 10/1975 | Laauwe |
| 3,913,804 A | 10/1975 | Laauwe |
| 3,913,842 A | 10/1975 | Singer |
| 3,932,973 A | 1/1976 | Moore |
| 3,936,002 A | 2/1976 | Geberth, Jr. |
| 3,938,708 A | 2/1976 | Burger |
| 3,975,554 A | 8/1976 | Kummins et al. |
| 3,982,698 A | 9/1976 | Anderson |
| 3,989,165 A | 11/1976 | Shaw et al. |
| 3,991,916 A | 11/1976 | Del Bon |
| 3,992,003 A | 11/1976 | Visceglia et al. |
| 4,010,134 A | 3/1977 | Braunisch et al. |
| 4,032,064 A | 6/1977 | Giggard |
| 4,036,673 A | 7/1977 | Murphy et al. |
| 4,045,860 A | 9/1977 | Winckler |
| 4,089,443 A | 5/1978 | Zrinyi |
| 4,096,974 A | 6/1978 | Haber et al. |
| 4,117,951 A | 10/1978 | Winckler |
| 4,129,448 A | 12/1978 | Greenfield et al. |
| 4,147,284 A | 4/1979 | Mizzi |
| 4,148,416 A | 4/1979 | Gunn-Smith |
| 4,154,378 A | 5/1979 | Paoletti et al. |
| 4,164,492 A | 8/1979 | Cooper |
| RE30,093 E | 9/1979 | Burger |
| 4,171,757 A | 10/1979 | Diamond |
| 4,173,558 A | 11/1979 | Beck |
| 4,185,758 A | 1/1980 | Giggard |
| 4,187,959 A | 2/1980 | Pelton |
| 4,187,985 A | 2/1980 | Goth |

(56) References Cited

U.S. PATENT DOCUMENTS

| | | |
|---|---|---|
| 4,198,365 A | 4/1980 | Pelton |
| 4,202,470 A | 5/1980 | Fujii |
| 4,238,264 A | 12/1980 | Pelton |
| 4,240,940 A | 12/1980 | Vasishth et al. |
| 4,258,141 A | 3/1981 | Jarre et al. |
| 4,275,172 A | 6/1981 | Barth et al. |
| 4,293,353 A | 10/1981 | Pelton et al. |
| 4,308,973 A | 1/1982 | Irland |
| 4,310,108 A | 1/1982 | Motoyama et al. |
| 4,322,020 A | 3/1982 | Stone |
| 4,346,743 A | 8/1982 | Miller |
| 4,354,638 A | 10/1982 | Weinstein |
| 4,358,388 A | 11/1982 | Daniel et al. |
| 4,370,930 A | 2/1983 | Strasser et al. |
| 4,372,475 A | 2/1983 | Goforth et al. |
| 4,401,271 A | 8/1983 | Hansen |
| 4,401,272 A | 8/1983 | Merton et al. |
| 4,411,387 A | 10/1983 | Stern et al. |
| 4,417,674 A | 11/1983 | Giuffredi |
| 4,420,575 A | 12/1983 | Rapaport et al. |
| 4,438,221 A | 3/1984 | Fracalossi et al. |
| 4,442,959 A | 4/1984 | Del Bon et al. |
| 4,460,719 A | 7/1984 | Danville |
| 4,482,662 A | 11/1984 | Rapaport et al. |
| 4,496,081 A | 1/1985 | Farrey |
| 4,546,905 A | 10/1985 | Nandagiri et al. |
| 4,595,127 A | 6/1986 | Stoody |
| 4,609,608 A | 9/1986 | Solc |
| 4,641,765 A | 2/1987 | Diamond |
| 4,683,246 A | 7/1987 | Davis et al. |
| 4,702,400 A | 10/1987 | Corbett |
| 4,728,007 A | 3/1988 | Samuelson et al. |
| 4,744,495 A | 5/1988 | Warby |
| 4,761,312 A | 8/1988 | Koshi et al. |
| 4,792,062 A | 12/1988 | Goncalves |
| 4,793,162 A | 12/1988 | Emmons |
| 4,804,144 A | 2/1989 | Denman |
| 4,815,414 A | 3/1989 | Duffy et al. |
| 4,819,838 A | 4/1989 | Hart, Jr. |
| 4,830,224 A | 5/1989 | Brison |
| 4,839,393 A | 6/1989 | Buchanan et al. |
| 4,854,482 A | 8/1989 | Bergner |
| 4,870,805 A | 10/1989 | Morane |
| 4,878,599 A | 11/1989 | Greenway |
| 4,887,651 A | 12/1989 | Santiago |
| 4,893,730 A | 1/1990 | Boldue |
| 4,896,832 A | 1/1990 | Howlett |
| D307,649 S | 5/1990 | Henry |
| 4,940,171 A | 7/1990 | Gilroy |
| 4,948,054 A | 8/1990 | Mills |
| 4,949,871 A | 8/1990 | Flanner |
| 4,951,876 A | 8/1990 | Mills |
| 4,953,759 A | 9/1990 | Schmidt |
| 4,954,544 A | 9/1990 | Chandaria |
| 4,955,545 A | 9/1990 | Stern et al. |
| 4,961,537 A | 10/1990 | Stern |
| 4,969,577 A | 11/1990 | Werding |
| 4,969,579 A | 11/1990 | Behar |
| 4,988,017 A | 1/1991 | Schrader et al. |
| 4,991,750 A | 2/1991 | Moral |
| 5,007,556 A | 4/1991 | Lover |
| 5,009,390 A | 4/1991 | McAuliffe, Jr. et al. |
| 5,037,011 A | 8/1991 | Woods |
| 5,038,964 A | 8/1991 | Bouix |
| 5,052,585 A | 10/1991 | Bolduc |
| 5,059,187 A | 10/1991 | Sperry et al. |
| 5,065,900 A | 11/1991 | Scheindel |
| 5,069,390 A | 12/1991 | Stern et al. |
| 5,083,685 A | 1/1992 | Amemiya et al. |
| 5,100,055 A | 3/1992 | Rokitenetz et al. |
| 5,115,944 A | 5/1992 | Nikolich |
| 5,126,086 A | 6/1992 | Stoffel |
| 5,169,037 A | 12/1992 | Davies et al. |
| 5,182,316 A | 1/1993 | DeVoe et al. |
| 5,188,263 A | 2/1993 | Woods |
| 5,188,295 A | 2/1993 | Stern et al. |
| 5,211,317 A | 5/1993 | Diamond et al. |
| 5,219,609 A | 6/1993 | Owens |
| 5,250,599 A | 10/1993 | Swartz |
| 5,277,336 A | 1/1994 | Youel |
| 5,297,704 A | 3/1994 | Stollmeyer |
| 5,307,964 A | 5/1994 | Toth |
| 5,310,095 A | 5/1994 | Stern et al. |
| 5,312,888 A | 5/1994 | Nafziger et al. |
| 5,314,097 A | 5/1994 | Smrt et al. |
| 5,323,963 A | 6/1994 | Ballu |
| 5,341,970 A | 8/1994 | Woods |
| 5,342,597 A | 8/1994 | Tunison, III |
| 5,368,207 A | 11/1994 | Cruysberghs |
| 5,374,434 A | 12/1994 | Clapp et al. |
| 5,405,051 A | 4/1995 | Miskell |
| 5,409,148 A | 4/1995 | Stern et al. |
| 5,417,357 A | 5/1995 | Yquel |
| D358,989 S | 6/1995 | Woods |
| 5,421,519 A | 6/1995 | Woods |
| 5,425,824 A | 6/1995 | Marwick |
| 5,450,983 A | 9/1995 | Stern et al. |
| 5,467,902 A | 11/1995 | Yquel |
| 5,476,879 A | 12/1995 | Woods et al. |
| 5,489,048 A | 2/1996 | Stern et al. |
| 5,498,282 A | 3/1996 | Miller et al. |
| 5,501,375 A | 3/1996 | Nilson |
| 5,505,344 A | 4/1996 | Woods |
| 5,523,798 A | 6/1996 | Hagino et al. |
| 5,524,798 A | 6/1996 | Stern et al. |
| 5,544,783 A | 8/1996 | Conigliaro |
| 5,548,010 A | 8/1996 | Franer |
| 5,549,228 A | 8/1996 | Brown |
| 5,558,247 A | 9/1996 | Caso |
| 5,562,235 A | 10/1996 | Cruysberghs |
| 5,570,813 A | 11/1996 | Clark, II |
| 5,573,137 A | 11/1996 | Pauls |
| 5,583,178 A | 12/1996 | Oxman et al. |
| 5,597,095 A | 1/1997 | Ferrara, Jr. |
| 5,615,804 A | 4/1997 | Brown |
| 5,639,026 A | 6/1997 | Woods |
| 5,641,095 A | 6/1997 | de Laforcade |
| 5,645,198 A | 7/1997 | Stern et al. |
| 5,655,691 A | 8/1997 | Stern et al. |
| 5,695,788 A | 12/1997 | Woods |
| 5,715,975 A | 2/1998 | Stern et al. |
| 5,727,736 A | 3/1998 | Tryon |
| 5,752,631 A | 5/1998 | Yabuno et al. |
| 5,775,432 A | 7/1998 | Burns et al. |
| 5,792,465 A | 8/1998 | Hagarty |
| 5,799,879 A | 9/1998 | Ottl et al. |
| 5,865,351 A | 2/1999 | De Laforcade |
| 5,868,286 A | 2/1999 | Mascitelli |
| 5,887,756 A | 3/1999 | Brown |
| 5,894,964 A | 4/1999 | Barnes et al. |
| 5,915,598 A | 6/1999 | Yazawa et al. |
| 5,921,446 A | 7/1999 | Stern |
| 5,934,518 A | 8/1999 | Stern et al. |
| 5,941,462 A | 8/1999 | Sandor |
| 5,957,333 A | 9/1999 | Losenno et al. |
| 5,975,356 A | 11/1999 | Yquel et al. |
| 5,988,575 A | 11/1999 | Lesko |
| 6,000,583 A | 12/1999 | Stern et al. |
| 6,027,042 A | 2/2000 | Smith |
| 6,032,830 A | 3/2000 | Brown |
| 6,039,306 A | 3/2000 | Pericard et al. |
| 6,062,494 A | 5/2000 | Mills |
| 6,070,770 A | 6/2000 | Tada et al. |
| 6,092,698 A | 7/2000 | Bayer |
| 6,095,435 A | 8/2000 | Greer, Jr. et al. |
| 6,112,945 A | 9/2000 | Woods |
| 6,113,070 A | 9/2000 | Holzboog |
| 6,116,473 A | 9/2000 | Stern et al. |
| 6,129,247 A | 10/2000 | Thomas et al. |
| 6,131,777 A | 10/2000 | Warby |
| 6,139,821 A | 10/2000 | Fuerst et al. |
| 6,152,335 A | 11/2000 | Stern et al. |
| 6,161,735 A | 12/2000 | Uchiyama et al. |
| 6,168,093 B1 | 1/2001 | Greer, Jr. et al. |

(56) References Cited

U.S. PATENT DOCUMENTS

| | | |
|---|---|---|
| 6,170,717 B1 | 1/2001 | Di Giovanni et al. |
| D438,111 S | 2/2001 | Woods |
| D438,786 S | 3/2001 | Ghali |
| 6,225,393 B1 | 5/2001 | Woods |
| 6,254,015 B1 | 7/2001 | Abplanalp |
| 6,257,503 B1 | 7/2001 | Baudin |
| 6,261,631 B1 | 7/2001 | Lomasney et al. |
| 6,265,459 B1 | 7/2001 | Mahoney et al. |
| 6,276,570 B1 | 8/2001 | Stern et al. |
| 6,283,171 B1 | 9/2001 | Blake |
| 6,284,077 B1 | 9/2001 | Lucas et al. |
| 6,290,104 B1 | 9/2001 | Bougamont et al. |
| 6,291,536 B1 | 9/2001 | Taylor |
| 6,296,155 B1 | 10/2001 | Smith |
| 6,296,156 B1 | 10/2001 | Lasserre et al. |
| 6,299,679 B1 | 10/2001 | Montoya |
| 6,299,686 B1 | 10/2001 | Mills |
| 6,315,152 B1 | 11/2001 | Kalisz |
| 6,325,256 B1 | 12/2001 | Liljeqvist et al. |
| 6,328,185 B1 | 12/2001 | Stern et al. |
| 6,328,197 B1 | 12/2001 | Gapihan |
| 6,333,365 B1 | 12/2001 | Lucas et al. |
| 6,352,184 B1 | 3/2002 | Stern et al. |
| 6,362,302 B1 | 3/2002 | Boddie |
| 6,375,036 B1 | 4/2002 | Woods |
| 6,382,474 B1 | 5/2002 | Woods et al. |
| 6,386,402 B1 | 5/2002 | Woods |
| 6,394,321 B1 | 5/2002 | Bayer |
| 6,394,364 B1 | 5/2002 | Abplanalp |
| 6,395,794 B2 | 5/2002 | Lucas et al. |
| 6,398,082 B2 | 6/2002 | Clark et al. |
| 6,399,687 B2 | 6/2002 | Woods |
| 6,414,044 B2 | 7/2002 | Taylor |
| 6,415,964 B2 | 7/2002 | Woods |
| 6,439,430 B1 | 8/2002 | Gilroy, Sr. et al. |
| 6,446,842 B2 | 9/2002 | Stern et al. |
| D464,395 S | 10/2002 | Huang |
| 6,474,513 B2 | 11/2002 | Burt |
| 6,478,198 B2 | 11/2002 | Haroian |
| 6,478,561 B2 | 11/2002 | Braun et al. |
| 6,482,392 B1 | 11/2002 | Zhou et al. |
| D468,980 S | 1/2003 | Woods |
| 6,510,969 B2 | 1/2003 | Di Giovanni et al. |
| 6,520,377 B2 | 2/2003 | Yquel |
| 6,531,528 B1 | 3/2003 | Kurp |
| 6,536,633 B2 | 3/2003 | Stern et al. |
| 6,581,807 B1 | 6/2003 | Mekata |
| 6,588,628 B2 | 7/2003 | Abplanalp et al. |
| 6,595,393 B1 | 7/2003 | Loghman-Adham et al. |
| 6,613,186 B2 | 9/2003 | Johnson |
| 6,615,827 B2 | 9/2003 | Greenwood et al. |
| 6,637,627 B1 | 10/2003 | Liljeqvist et al. |
| 6,641,005 B1 | 11/2003 | Stern et al. |
| 6,641,864 B2 | 11/2003 | Woods |
| 6,652,704 B2 | 11/2003 | Green |
| 6,659,312 B1 | 12/2003 | Stern et al. |
| 6,666,352 B1 | 12/2003 | Woods |
| 6,688,492 B2 | 2/2004 | Jaworski et al. |
| 6,712,238 B1 | 3/2004 | Mills |
| 6,726,066 B2 | 4/2004 | Woods |
| 6,736,288 B1 | 5/2004 | Green |
| 6,758,373 B2 | 7/2004 | Jackson et al. |
| 6,797,051 B2 | 9/2004 | Woods |
| 6,802,461 B2 | 10/2004 | Schneider |
| 6,831,110 B2 | 12/2004 | Ingold et al. |
| 6,832,704 B2 | 12/2004 | Smith |
| 6,837,396 B2 | 1/2005 | Jaworski et al. |
| 6,843,392 B2 | 1/2005 | Walker |
| D501,538 S | 2/2005 | Zeng |
| D501,914 S | 2/2005 | Chen |
| 6,848,601 B2 | 2/2005 | Greer, Jr. |
| 6,851,575 B2 | 2/2005 | van't Hoff |
| D502,533 S | 3/2005 | Chen |
| 6,880,733 B2 | 4/2005 | Park |
| 6,883,688 B1 | 4/2005 | Stern et al. |
| 6,894,095 B2 | 5/2005 | Russo et al. |
| 6,905,050 B1 | 6/2005 | Stern et al. |
| 6,910,608 B2 | 6/2005 | Greer, Jr. et al. |
| 6,913,407 B2 | 7/2005 | Greer et al. |
| 6,926,178 B1 | 8/2005 | Anderson |
| 6,929,154 B2 | 8/2005 | Grey et al. |
| 6,932,244 B2 | 8/2005 | Meshberg |
| 6,966,467 B2 | 11/2005 | Di Giovanni et al. |
| D512,309 S | 12/2005 | Geier |
| 6,971,353 B2 | 12/2005 | Heinze et al. |
| 6,971,553 B2 | 12/2005 | Brennan et al. |
| 6,978,916 B2 | 12/2005 | Smith |
| 6,978,947 B2 | 12/2005 | Jin |
| 6,981,616 B2 | 1/2006 | Loghman-Adham et al. |
| 7,014,073 B1 | 3/2006 | Stern et al. |
| 7,014,127 B2 | 3/2006 | Valpey, III et al. |
| 7,036,685 B1 | 5/2006 | Green |
| 7,045,008 B2 | 5/2006 | Langford |
| 7,059,497 B2 | 6/2006 | Woods |
| 7,059,546 B2 | 6/2006 | Ogata et al. |
| 7,063,236 B2 | 6/2006 | Greer, Jr. et al. |
| 7,104,424 B2 | 9/2006 | Kolanus |
| 7,104,427 B2 | 9/2006 | Pericard et al. |
| 7,121,434 B1 | 10/2006 | Caruso |
| 7,163,962 B2 | 1/2007 | Woods |
| 7,182,227 B2 | 2/2007 | Poile et al. |
| 7,189,022 B1 | 3/2007 | Greer, Jr. et al. |
| 7,192,985 B2 | 3/2007 | Woods |
| 7,204,393 B2 | 4/2007 | Strand |
| 7,226,001 B1 | 6/2007 | Stern et al. |
| 7,226,232 B2 | 6/2007 | Greer, Jr. et al. |
| 7,232,047 B2 | 6/2007 | Greer, Jr. et al. |
| 7,237,697 B2 | 7/2007 | Dunne |
| 7,240,857 B1 | 7/2007 | Stern et al. |
| 7,249,692 B2 | 7/2007 | Walters et al. |
| 7,261,225 B2 | 8/2007 | Rueschhoff et al. |
| 7,267,248 B2 | 9/2007 | Yerby et al. |
| 7,278,590 B1 | 10/2007 | Greer, Jr. et al. |
| 7,303,152 B2 | 12/2007 | Woods |
| 7,307,053 B2 | 12/2007 | Tasz et al. |
| 7,337,985 B1 | 3/2008 | Greer, Jr. et al. |
| 7,341,169 B2 | 3/2008 | Bayer |
| 7,350,676 B2 | 4/2008 | Di Giovanni et al. |
| 7,374,068 B2 | 5/2008 | Greer, Jr. |
| 7,383,970 B2 | 6/2008 | Anderson |
| 7,445,166 B2 | 11/2008 | Williams |
| 7,448,517 B2 | 11/2008 | Shieh et al. |
| 7,481,338 B1 | 1/2009 | Stern et al. |
| 7,487,891 B2 | 2/2009 | Yerby et al. |
| 7,487,893 B1 | 2/2009 | Greer, Jr. et al. |
| 7,494,075 B2 | 2/2009 | Schneider |
| 7,500,621 B2 | 3/2009 | Tryon et al. |
| 7,510,102 B2 | 3/2009 | Schmitt |
| 7,556,841 B2 | 7/2009 | Kimball et al. |
| 7,597,274 B1 | 10/2009 | Stern et al. |
| 7,600,659 B1 | 10/2009 | Greer, Jr. et al. |
| 7,624,932 B1 | 12/2009 | Greer, Jr. et al. |
| 7,631,785 B2 | 12/2009 | Paas et al. |
| 7,641,079 B2 | 1/2010 | Lott et al. |
| 7,673,816 B1 | 3/2010 | Stern et al. |
| 7,677,420 B1 | 3/2010 | Greer, Jr. et al. |
| 7,744,299 B1 | 6/2010 | Greer, Jr. et al. |
| 7,766,196 B2 | 8/2010 | Sugano et al. |
| 7,775,408 B2 | 8/2010 | Yamamoto et al. |
| 7,784,647 B2 | 8/2010 | Tourigny |
| 7,784,649 B2 | 8/2010 | Greer, Jr. |
| 7,845,523 B1 | 12/2010 | Greer, Jr. et al. |
| 7,854,356 B2 | 12/2010 | Eberhardt |
| 7,886,995 B2 | 2/2011 | Togashi |
| 7,891,529 B2 | 2/2011 | Paas et al. |
| 7,913,877 B2 | 3/2011 | Neuhalfen |
| 7,922,041 B2 | 4/2011 | Gurrisi et al. |
| 7,926,741 B2 | 4/2011 | Laidler et al. |
| 7,947,753 B2 | 5/2011 | Greer, Jr. |
| 7,971,800 B2 | 7/2011 | Combs et al. |
| 7,984,834 B2 | 7/2011 | McBroom et al. |
| 8,016,163 B2 | 9/2011 | Behar et al. |
| 8,028,864 B2 | 10/2011 | Stern et al. |
| 8,033,432 B2 | 10/2011 | Pardonge et al. |

(56) References Cited

U.S. PATENT DOCUMENTS

| | | | |
|---|---|---|---|
| 8,033,484 B2 | 10/2011 | Tryon et al. |
| 8,038,077 B1 | 10/2011 | Greer, Jr. et al. |
| 8,042,713 B2 | 10/2011 | Greer, Jr. et al. |
| 8,087,552 B2 | 1/2012 | Fazekas et al. |
| 8,132,697 B2 | 3/2012 | Finlay et al. |
| 8,146,782 B2 | 4/2012 | Gross et al. |
| 8,157,135 B2 | 4/2012 | Stern et al. |
| 8,172,113 B2 | 5/2012 | Greer, Jr. |
| 8,187,574 B2 | 5/2012 | Mekata et al. |
| 8,201,757 B2 | 6/2012 | Suzuki |
| 8,215,862 B2 | 7/2012 | Greer, Jr. et al. |
| 8,221,019 B2 | 7/2012 | Greer, Jr. et al. |
| 8,251,255 B1 | 8/2012 | Greer, Jr. et al. |
| 8,281,958 B2 | 10/2012 | Matthews et al. |
| 8,313,011 B2 | 11/2012 | Greer, Jr. et al. |
| 8,317,065 B2 | 11/2012 | Stern et al. |
| 8,336,742 B2 | 12/2012 | Greer, Jr. et al. |
| 8,342,421 B2 | 1/2013 | Greer, Jr. et al. |
| 8,353,465 B2 | 1/2013 | Tryon et al. |
| 8,420,705 B2 | 4/2013 | Greer, Jr. |
| 8,505,786 B2 | 8/2013 | Stern et al. |
| 8,551,572 B1 * | 10/2013 | Tait .................. C09D 133/062 |
| | | | 239/337 |
| 8,561,840 B2 | 10/2013 | Greer, Jr. et al. |
| 8,573,451 B2 | 11/2013 | Tryon |
| 8,584,898 B2 | 11/2013 | Greer, Jr. et al. |
| 8,622,255 B2 | 1/2014 | Greer, Jr. |
| 8,647,006 B2 | 2/2014 | Greer, Jr. et al. |
| 8,701,944 B2 | 4/2014 | Tryon |
| 8,784,942 B2 | 7/2014 | Tait et al. |
| 8,844,765 B2 | 9/2014 | Tryon |
| 2001/0002676 A1 | 6/2001 | Woods |
| 2002/0000454 A1 * | 1/2002 | Stern ..................... B05B 1/02 |
| | | | 222/402.1 |
| 2002/0003147 A1 | 1/2002 | Corba |
| 2002/0100769 A1 | 8/2002 | McKune |
| 2002/0119256 A1 | 8/2002 | Woods |
| 2003/0102328 A1 | 6/2003 | Abplanalp et al. |
| 2003/0134973 A1 | 7/2003 | Chen et al. |
| 2003/0183651 A1 | 10/2003 | Greer, Jr. |
| 2003/0205580 A1 | 11/2003 | Yahav |
| 2004/0012622 A1 | 1/2004 | Russo et al. |
| 2004/0099697 A1 | 5/2004 | Woods |
| 2004/0141797 A1 | 7/2004 | Garabedian et al. |
| 2004/0154264 A1 | 8/2004 | Colbert |
| 2004/0157960 A1 | 8/2004 | Rowe |
| 2004/0195277 A1 | 10/2004 | Woods |
| 2005/0121474 A1 | 6/2005 | Lasserre et al. |
| 2005/0236436 A1 | 10/2005 | Woods |
| 2005/0256257 A1 | 11/2005 | Betremieux et al. |
| 2006/0049205 A1 | 3/2006 | Green |
| 2006/0079588 A1 | 4/2006 | Greer, Jr. |
| 2006/0180616 A1 | 8/2006 | Woods |
| 2006/0219808 A1 | 10/2006 | Woods |
| 2006/0219811 A1 | 10/2006 | Woods |
| 2006/0273207 A1 | 12/2006 | Woods |
| 2007/0117916 A1 | 5/2007 | Anderson et al. |
| 2007/0119984 A1 | 5/2007 | Woods |
| 2007/0125879 A1 | 6/2007 | Khamenian |
| 2007/0142260 A1 | 6/2007 | Tasz et al. |
| 2007/0155892 A1 | 7/2007 | Gharapetian et al. |
| 2007/0178243 A1 | 8/2007 | Houck et al. |
| 2007/0194040 A1 | 8/2007 | Tasz et al. |
| 2007/0219310 A1 | 9/2007 | Woods |
| 2007/0228086 A1 | 10/2007 | Delande et al. |
| 2007/0272765 A1 | 11/2007 | Kwasny |
| 2008/0033099 A1 | 2/2008 | Bosway |
| 2008/0041887 A1 | 2/2008 | Scheindel |
| 2012/0064249 A1 | 3/2012 | Greer, Jr. et al. |
| 2012/0132670 A1 | 5/2012 | Finlay et al. |
| 2013/0022747 A1 | 1/2013 | Greer, Jr. et al. |
| 2013/0102696 A1 | 4/2013 | Greer, Jr. et al. |
| 2013/0122200 A1 | 5/2013 | Greer, Jr. et al. |
| 2013/0230655 A1 | 9/2013 | Greer, Jr. |
| 2014/0050853 A1 | 2/2014 | Greer, Jr. et al. |
| 2014/0061335 A1 | 3/2014 | Tryon |
| 2014/0079882 A1 | 3/2014 | Greer, Jr. et al. |
| 2014/0113076 A1 | 4/2014 | Greer, Jr. et al. |
| 2014/0120260 A1 | 5/2014 | Greer, Jr. |
| 2014/0162023 A1 | 6/2014 | Greer, Jr. et al. |
| 2014/0248428 A1 | 9/2014 | Tryon |

FOREIGN PATENT DOCUMENTS

| | | |
|---|---|---|
| CA | 1191493 | 8/1985 |
| CA | 1210371 | 8/1986 |
| CA | 2145129 | 9/1995 |
| CA | 2090185 | 10/1998 |
| CA | 2224042 | 6/1999 |
| CA | 2291599 | 6/2000 |
| CA | 2381994 | 2/2001 |
| CA | 2327903 | 6/2001 |
| CA | 2065534 | 8/2003 |
| CA | 2448794 | 5/2004 |
| CA | 2504509 | 10/2005 |
| CA | 2504513 | 10/2005 |
| CH | 680849 | 11/1992 |
| DE | 210449 | 5/1909 |
| DE | 1926796 | 3/1970 |
| DE | 3808438 | 4/1989 |
| DE | 3806991 | 9/1989 |
| FR | 463476 | 2/1914 |
| FR | 84727 | 4/1965 |
| FR | 1586067 | 2/1970 |
| FR | 2659847 | 9/1991 |
| GB | 867713 | 5/1961 |
| GB | 970766 | 9/1964 |
| GB | 977860 | 12/1964 |
| GB | 1144385 | 3/1969 |
| GB | 2418959 | 4/2006 |
| JP | 461392 | 1/1971 |
| JP | 55142073 | 11/1980 |
| JP | 8332414 | 12/1996 |
| WO | 9418094 | 8/1994 |
| WO | 2005087617 | 9/2005 |
| WO | 2005108240 | 11/2005 |
| WO | WO2006090229 | 8/2006 |

OTHER PUBLICATIONS

Homax Products, Inc., "Easy Touch Spray Texture Brochure"; Mar. 1992; 1 Page.

Newman-Green, Inc., "Aerosol Valves, Sprayheads & Accessories Catalog"; Apr. 1, 1992; pp. 14, 20 and 22.

Tait, William Stephen, Ph.D., "An Introduction to Electrochemical Corrosion Testing for Practicing Engineers and Scientists", 1994, 17 Pages; PairODocs Publications, Racine, Wisconsin.

Chadwick, John, "Controling Particle Size in Self-Pressurized Aerosol Packages", "Metal Finishing"; Aug. 2004; 3 Pages, vol. 102, No. 7/8.

* cited by examiner

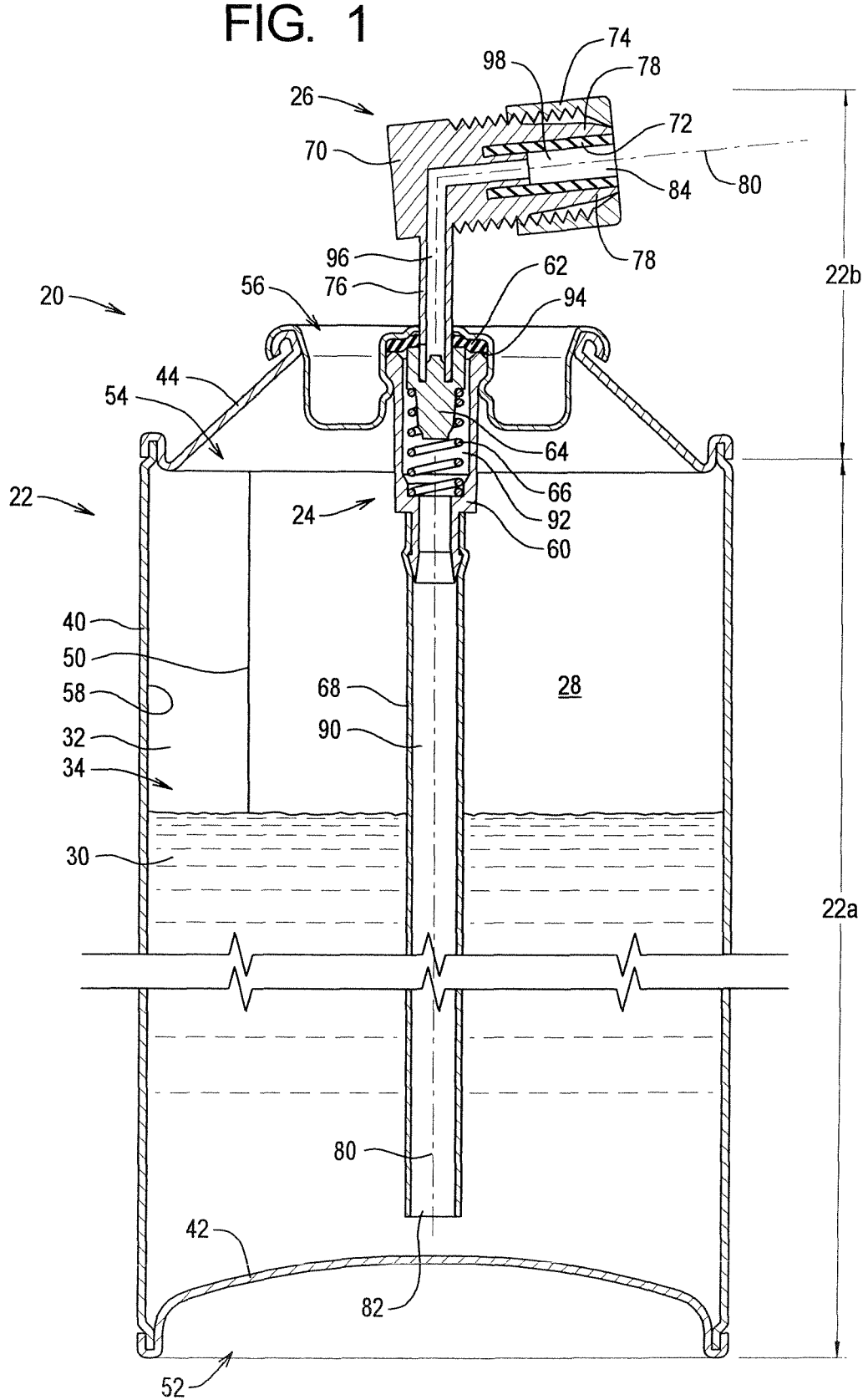

SPRAY TEXTURE MATERIAL COMPOSITIONS, SYSTEMS, AND METHODS WITH ACCELERATED DRY TIMES

RELATED APPLICATIONS

This application (Attorney's Ref. No. P218085) is a continuation of U.S. patent application Ser. No. 14/452,254 filed Aug. 5, 2014, currently pending.

U.S. patent application Ser. No. 14/452,254 is a continuation of U.S. patent application Ser. No. 13/562,033 filed Jul. 30, 2012, now abandoned.

U.S. patent application Ser. No. 13/562,033 is a continuation of U.S. patent application Ser. No. 12/080,671 filed Apr. 4, 2008, now abandoned.

U.S. patent application Ser. No. 12/080,671 claims benefit of U.S. Provisional Patent Application Ser. No. 60/922,117 filed Apr. 5, 2007.

The contents of all related applications are incorporated herein by reference.

TECHNICAL FIELD

The present invention relates to texture material compositions, systems, and methods and, more particularly, texture material compositions adapted to be dispensed using an aerosol dispensing system.

BACKGROUND

The surfaces of drywall materials defining wall and ceiling surfaces are commonly coated with texture materials. Texture materials are coatings that are deposited in discrete drops that dry to form a bumpy, irregular texture on the destination surface. Texture materials are commonly applied using a hopper gun connected to a source of pressurized air. However, when only a small area is to be coated or an existing textured surface is repaired, texture materials are typically applied using an aerosol dispensing system.

An aerosol dispensing system for dispensing texture material typically comprises a container assembly, a valve assembly, and an outlet assembly. The container assembly contains the texture material and a propellant material. The propellant material pressurizes the texture material within the container assembly. The valve assembly is mounted to the container assembly in a normally closed configuration but can be placed in an open configuration to define a dispensing path along which the pressurized texture material is forced out of the container assembly by the propellant material. Displacement of the outlet assembly places the valve assembly in the open configuration. The outlet assembly defines a portion of the outlet path and is configured such that the texture material is applied to the destination surface in an applied texture pattern.

The propellant used by aerosol dispensing systems for texture materials may simply be a compressed inert gas such as air or nitrogen. More typically, the propellant used by aerosol dispensing systems is a bi-phase propellant material, including mixtures of volatile hydrocarbons such as propane, n-butane, isobutane, dimethyl ether (DME), and methylethyl ether.

At room temperature, bi-phase propellant materials typically exist in both liquid and vapor states within the container assembly. Prior to use, the vapor portion of the bi-phase propellant material is pressurized to an equilibrium pressure. When the valve assembly is placed in its open configuration, the vapor portion of the bi-phase propellant material forces the texture material out of the container assembly along the dispensing path.

When the valve assembly returns to its closed position, part of the liquid portion of the bi-phase propellant material changes to the vapor state because of the drop in pressure within the container assembly. The vapor portion of the propellant material returns the pressure within the container assembly to the equilibrium value in preparation for the next time texture material is to be dispensed from the aerosol dispensing system.

The texture material dispensed by an aerosol dispensing system may employ a solvent base, a water base, or a base containing a combination of water and water soluble solvents. A solvent based texture material dries quickly but can be malodorous and may require the use of complementary solvent cleaners for clean up. A water based texture material is typically not malodorous and can be cleaned using water but can take significantly longer to dry. A water/solvent based texture material can be cleaned using water, is typically not unacceptably malodorous, and has a dry time somewhere between solvent based and water based texture materials.

The need exists for formulations of water/solvent based texture materials that may be used to form an orange peel texture pattern.

SUMMARY

The present invention may be embodied as a system for dispensing texture material in an orange peel pattern comprising an aerosol dispenser and a contained material. The aerosol dispenser comprises a container assembly formed at least in part of tin-plated steel, a valve assembly that controls flow of pressurized fluid out of the container assembly, and an outlet assembly that alters a cross-sectional area of an outlet opening through which pressurized fluid flowing out of the container assembly through the valve assembly passes. The contained material comprises texture material and propellant material. The texture material a solvent carrier, latex binder, fillers, and drier accelerant. The contained material is disposed within the container assembly. The outlet assembly is operated to alter the cross-sectional of the outlet opening such that the cross-sectional area of the outlet opening corresponds to a desired orange peel texture pattern. The valve assembly is operated to allow the propellant material to force at least a portion of the texture material out of the outlet opening in a spray pattern corresponding to the desired orange peel texture pattern. The drier accelerant promotes drying of the dispensed texture material in the desired orange peel texture pattern.

The present invention may also be embodied as a method of dispensing texture material in an orange peel pattern comprising the following steps. An aerosol dispenser is provided. The aerosol dispenser comprises a container assembly formed at least in part of tin-plated steel, a valve assembly that controls flow of pressurized fluid out of the container assembly, and an outlet assembly that alters a cross-sectional area of an outlet opening through which pressurized fluid flowing out of the container assembly through the valve assembly passes. A contained material is formed by combining texture material and propellant material. The texture material comprises a solvent/carrier, latex binder, fillers, and drier accelerant. The contained material is arranged within the container assembly. The outlet assembly is operated to alter the cross-sectional of the outlet opening such that the cross-sectional area of the outlet opening corresponds to a desired orange peel texture pattern. Operating the valve assembly to allow the propellant material to force at least a portion of the texture material out of the outlet opening in a spray pattern corresponding to the desired orange peel texture pattern such that the drier accelerant promotes drying of the dispensed texture material in the desired orange peel texture pattern.

BRIEF DESCRIPTION OF THE DRAWINGS

FIG. 1 is a section view of a first example aerosol dispensing system for texture material of the present invention.

DETAILED DESCRIPTION

Figure 2A:
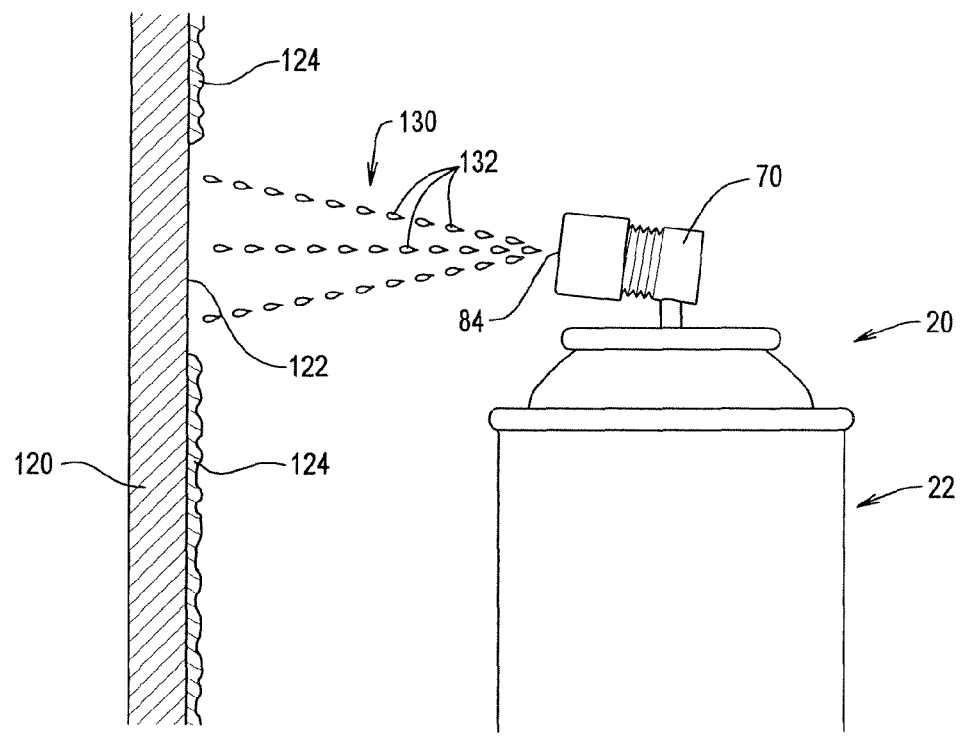
FIGS. 2A-2B are side elevation views depicting the process of using the aerosol dispensing system of FIG. 1 to apply texture material to a destination wall surface.

Referring initially to FIG. 1 of the drawing, depicted therein is an aerosol dispensing system 20 constructed in accordance with, and embodying, the principles of the present invention. The aerosol dispensing system 20 comprises a container assembly 22, a valve assembly 24, and an outlet assembly 26. The container assembly 22 and valve assembly 24 define a main chamber 28.

The main chamber 28 contains a liquid material 30 and a vapor material 32. The liquid material 30 comprises propellant material in liquid form and an orange peel texture material concentrate. The vapor material 32 comprises propellant material in vapor form. The combination of the liquid material 30 and the vapor material 32 in the container assembly 22 will be referred to as the contained material 34.

When the valve assembly 24 is in a closed configuration, the flow of fluid out of the main chamber 28 is substantially prevented. However, the vapor material 32 pressurizes the liquid material 30 within the main chamber 28 such that, when the valve assembly 24 is in an open configuration, the vapor material 32 forces the liquid material 30 out of the main chamber 28.

As perhaps best shown in FIG. 1, the example container assembly 22 comprises a main member 40, a bottom cap 42, and an end cap 44 formed of tin-plated steel. The tin-plated steel used to form the main member 40, bottom cap 42, and end cap 44 comprises a thin sheet of steel coated on one side by an even thinner layer (approximately 0.5 microns) of tin.

The main member 40 is a rectangular sheet that is rolled into a cylinder and welded along a seam 50 to define first and second end openings 52 and 54. The bottom cap 42 is a shaped tin-plated steel member that is crimped onto the cylindrical main member 40 to seal the first end opening 52. The end cap 44 is also a shaped tin-plated steel member defining a mounting opening 56; the end cap 44 is crimped onto the main member 40 such that fluid may not flow through the second opening 54 between the end cap 44 and the main member 40. The main member 40, bottom cap 42, and end cap 44 define an interior metal surface 58 of the container assembly 22.

With the bottom cap 42 covering the first opening 52, the end cap 44 covering the second opening 54, and the valve assembly 24 supported by the end cap 44, the aerosol dispensing system 20 defines the main chamber 28.

Alternatively, the container assembly 22 may be made of aluminum, in which case the bottom cap portion and the end cap portion may be integrally formed with the main member portion.

The example texture material concentrate is generally formulated as follows.

EXAMPLE OF ORANGE PEEL TEXTURE MATERIAL CONCENTRATE

| COMPONENT | FIRST EXAMPLE | FIRST PREFERRED RANGE | SECOND PREFERRED RANGE |
|---|---|---|---|
| solvent/carrier (water) | 29.28% | 24-34% | 19-39% |
| resin/binder (latex) | 5.13% | 4.1-6.1% | 2-10% |
| fillers (cellulosic thickener, clay, talc, calcium carbonate) | 53.09% | 48-58% | 43-63% |
| additives (biocide, dispersant, defoamer) | 0.53% | 0.2-1.0% | 0-3% |
| drier accelerant (isopropyl alcohol) | 6.79% | 4.8-8.8% | 2-12% |

The texture material concentrate described in the table set forth above is combined in the container assembly 22 with the propellant material to obtain the contained material 34. The preferred amount of propellant material used to form the example dispensing system 20 is approximately 12.6% of the texture material concentrate by weight and is preferably within a first preferred range of substantially between 10% and 15% and is in any event preferably within a second preferred range of substantially between 5% and 20%. The propellant material is typically dimethyl ether (DME).

The solvent/carrier of the example formulation set forth in the table above is water. The resin/binder is or may be a conventional latex binder. The fillers may comprise any conventional pigments, extenders, and thickeners. If used, the additives forming part of the formulation described in the table set forth above typically comprise conventional biocides, dispersants, and defoamers.

The drier accelerant may be any water soluble solvent such as such as tetrahydrofuran, acetone, methanol, isopropanol, ethanol, N-propanol, propylene glycol monomethylether, propylene glycol n-propyl ether, diethylene glycol monomethyl ether, diacetone alchohol, ethylene glycol monobutyl ether, N-methyl pyrrolidone, dipropylene glycol methyl ether, diethanolamine, diethylene glycol monethyl ether, diethylene glycol, methyl ethyl ketone, and methyl acetate.

In the context of the example container assembly 22 comprising tin-plated steel components, the texture material concentrate may be formulated to have anti-corrosion properties. In this case, the texture material concentrate may further comprise first and second anti-corrosion materials are included to promote passive corrosion behavior of the metal interior surface 58 of the container assembly 22 in contact with the texture material concentrate. Passive corrosion behavior occurs when the interaction between a metal structure and the environment forms a thin protective film on the surface of the metal structure. Passive corrosion produces essentially no corrosion of the metal structure and thus is very desirable.

In the example texture material concentrate, the first anti-corrosion material is an aninonic, phosphate ester. The example first anti-corrosion material is Elfugin, a proprietary product sold by Clariant Paper Chemicals as an antistatic for application to paper products. In the general example described above, approximately 1.00% (±5%) of the first anti-corrosion material is preferably used. The second anti-corrosion material of the example texture material concentrate is sodium nitrite. In the general example described above, approximately 0.100% (±5%) or 0.250% (±5%) of the first anti-corrosion material is preferably used, depending upon the nature of the remaining components of the texture material concentrate and propellant.

Generally speaking, the first anti-corrosion material should be within a first preferred range of substantially between 0.5% and 2% and in any event should be within a second preferred range of substantially between 0.1 and 5.0%. The second anti-corrosion material should be within a first preferred range of substantially between 0.05% and 1.0% and in any event should be within a second preferred range of substantially between 0.025% and 2.0%. The amount of water set forth in the foregoing table should be reduced by the amount of the first and second anti-corrosion materials used.

If the anti-corrosion materials are used, the texture material concentrate is preferably formulated and combined with propellant material as follows. The first and second anti-corrosion materials are initially dissolved in the water. The remaining materials are then mixed with the water solution to obtain the texture material concentrate.

If the container assembly is formed of tin-plated steel, the bottom cap 42 is crimped onto the main member 40 to form a container subassembly 22a. The valve assembly 24 is combined with the end cap 44 to form a cap subassembly 22b. The texture material concentrate is placed within the container subassembly 22a. The cap subassembly 22b is crimped onto the container subassembly 22a to form the container assembly 22. The propellant material is then introduced into the container assembly 22 through the valve assembly 24. The outlet assembly 26 is then engaged with the valve assembly to form the aerosol dispensing system 20.

With the foregoing general understanding of the present invention, the details of several example formulations of the texture material concentrate and the construction and use of the example aerosol dispensing system 20 will now be described in further detail with reference to FIG. 1.

The example valve assembly 24 comprises a valve housing 60, a valve seat 62, a valve member 64, and a valve spring 66. The end cap 44 supports the valve housing 60 and the valve seat 62 adjacent to the mounting opening 56. The valve housing 60 supports the valve spring 66 such that the valve spring 66 biases the valve member 64 against the valve seat 62 in a normally closed position. An intake tube 68 extends from the valve housing 60 to the end of the main member 40 closed by the bottom cap 42.

The outlet assembly 26 comprises an actuator member 70, a resilient member 72, and a clamp member 74. The actuator member defines a stem portion 76 and a plurality of finger portions 78. The stem portion 76 extends through the mounting opening 56 and engages the valve member 64. The actuator member 70 supports the resilient member 72 such that the resilient member 72 is held within the finger portions 78. The clamp member 74 engages the actuator member 70 such that displacement of the clamp member 74 relative to the actuator member 70 bends the finger portions 78 towards each other to deform the resilient member 72.

A dispensing path 80 extends between an inlet opening 82 defined by the intake tube 68 and an outlet opening 84 defined by the resilient member 72. Fluid is prevented from flowing along the dispensing path 80 when the valve assembly 24 is in the closed configuration as defined above. Fluid may flow along the dispensing path 80 when the valve assembly 24 is in the open configuration. The spray pattern of liquid flowing out of the main chamber 28 through the outlet opening 84 may be varied by deforming the resilient member 72 as described above.

More specifically, the valve spring 66 normally biases the valve member 64 against the valve seat 62 to close the dispensing path 80. When the actuator member 70 is displaced towards the container assembly 22, the valve member 64 is displaced away from the valve seat 62 against the force of the valve spring 66 to place the valve assembly 24 in its open configuration. In this open configuration, the example dispensing path 80 extends through a first passageway 90 defined by the intake tube 68, a valve chamber 92 defined by the valve housing 60, a gap 94 between valve member 64 and the valve seat 62, a second passageway 96 defined by the actuator member 70, and a third passageway 98 defined by the resilient member 72.

Figure 2B:
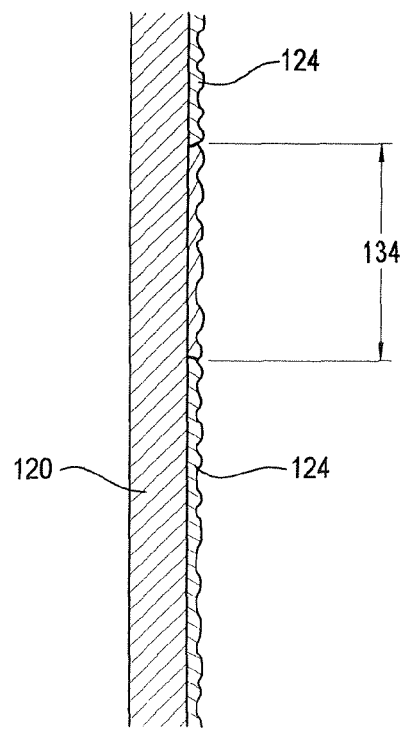

Turning now to FIGS. 2A-2B of the drawing, depicted therein is an example of use of the example dispensing system 20 described above. The example dispensing system 20 is used to apply texture material to a wall member 120 defining a target surface portion 122. In the case of a repair to the wall member 120, existing spray texture material 124 typically surrounds the target surface portion 122.

Initially, the dispensing system 20 is arranged such that the outlet opening 84 faces the target surface portion 122. The actuator member 70 is then displaced to place the valve assembly 24 in its open configuration. The pressurized propellant material causes a portion of the contained material 34 to be dispensed from the container assembly 22 through the dispensing path 80.

Because of the formulation of the contained material 34 and the geometry of the resilient member 72, the contained material exits the container assembly 22 in a spray 130 comprising discrete droplets 132. The droplets 132 are deposited onto the target surface 122 to form a texture coating 134 in an applied texture pattern. The texture coating 134 is initially wet but dries when exposed to air.

By appropriately selecting the cross-sectional area of the outlet opening 84, the applied texture pattern of the texture coating 134 can be formed such that the applied texture pattern substantially matches the existing pattern of the existing texture material 124.

In the example dispensing system 20 described above, the outlet opening 84 is varied using the collar 74 to deform the fingers 78 and thus the resilient member 72. Alternatively, the outlet opening of the dispensing system 20 may be varied using any of the structures described, for example, in U.S. Pat. No. 6,536,633, and the teachings of that patent are incorporated herein by reference.

The scope of the present invention should be determined by the claims appended hereto and not the foregoing detailed description of the invention.

What is claimed is:

1. A system for dispensing texture material in an orange peel pattern, comprising:
   an aerosol dispenser comprising
      a container assembly formed at least in part of tin-plated steel,
      a valve assembly that controls flow of pressurized fluid out of the container assembly, and
      an outlet assembly that alters a cross-sectional area of an outlet opening through which pressurized fluid flowing out of the container assembly through the valve assembly passes;
   a contained material comprising
      texture material, where the texture material comprises by weight
         approximately 19-39% water, approximately 2-10% latex binder,
approximately 43-63% fillers, and
approximately 2-12% drier accelerant;
a propellant material, where the contained material comprises
approximately 5-20% by weight of the propellant material;
wherein
the contained material is disposed within the container assembly;
the outlet assembly is operated to alter the cross-sectional of the outlet opening such that the cross-sectional area of the outlet opening corresponds to a desired orange peel texture pattern;
the valve assembly is operated to allow the propellant material to force at least a portion of the texture material out of the outlet opening in a spray pattern corresponding to the desired orange peel texture pattern; and
the drier accelerant promotes drying of the dispensed texture material in the desired orange peel texture pattern.

2. A system as recited in claim 1, in which the drier accelerant comprises at least one material selected from the group of materials comprising tetrahydrofuran, acetone, methanol, iso-propanol, ethanol, N-propanol, propylene glycol monomethylether, propylene glycol n-propyl ether, diethylene glycol monomethyl ether, diacetone alchohol, ethylene glycol monobutyl ether, N-methyl pyrrolidone, dipropylene glycol methyl ether, diethanolamine, diethylene glycol monethyl ether, diethylene glycol, methyl ethyl ketone, and methyl acetate.

3. A system as recited in claim 1, further comprising:
a first anti-corrosion material; and
a second anti-corrosion material; wherein
the amount of the first anti-corrosion material is selected with respect to the second anti-corrosion material to promote formation of a thin protective film on any portion of the container assembly made of tin-plated steel.

4. A system as recited in claim 3, in which:
the first anti-corrosion material comprises approximately 0.1-5% by weight of the texture material, where the first anti-corrosion material is a phosphate ester, and
a second anti-corrosion material comprises approximately 0.025-2.0% by weight of the texture material, where the second anti-corrosion material is sodium nitrite.

5. A system as recited in claim 1, in which the contained material comprises approximately 10-15% by weight of the propellant material.

6. A method dispensing texture material in an orange peel pattern, comprising the steps of:
an aerosol dispenser comprising
a container assembly formed at least in part of tin-plated steel,
a valve assembly that controls flow of pressurized fluid out of the container assembly, and
an outlet assembly that alters a cross-sectional area of an outlet opening through which pressurized fluid flowing out of the container assembly through the valve assembly passes;
forming a contained material by combining
texture material, where the texture material comprises by weight
approximately 19-39% water,
approximately 2-10% latex binder,
approximately 43-63% fillers, and
approximately 2-12% drier accelerant; and
a propellant material, where the contained material comprises
approximately 5-20% by weight of the propellant material;
wherein
arranging the contained material within the container assembly;
operating the outlet assembly to alter the cross-sectional of the outlet opening such that the cross-sectional area of the outlet opening corresponds to a desired orange peel texture pattern;
operating the valve assembly to allow the propellant material to force at least a portion of the texture material out of the outlet opening in a spray pattern corresponding to the desired orange peel texture pattern such that the drier accelerant promotes drying of the dispensed texture material in the desired orange peel texture pattern.

7. A method as recited in claim 6, in which the step of forming the texture material comprises the step of selecting at least one material from the group of materials comprising tetrahydrofuran, acetone, methanol, iso-propanol, ethanol, N-propanol, propylene glycol monomethylether, propylene glycol n-propyl ether, diethylene glycol monomethyl ether, diacetone alchohol, ethylene glycol monobutyl ether, N-methyl pyrrolidone, dipropylene glycol methyl ether, diethanolamine, diethylene glycol monethyl ether, diethylene glycol, methyl ethyl ketone, and methyl acetate to form the drier accelerant.

8. A method as recited in claim 6, in which the step of forming the contained material further comprises the steps of:
adding first and second anti-corrosion materials to the texture material; and
selecting amounts of the first and second anti-corrosion material with respect to each other such that the first and second anti-corrosion materials form a thin protective film on any portion of the container assembly made of tin-plated steel.

9. A method as recited in claim 8, in which:
the first anti-corrosion material comprises approximately 0.1-5% by weight of the texture material, where the first anti-corrosion material is a phosphate ester, and
a second anti-corrosion material comprises approximately 0.025-2.0% by weight of the texture material, where the second anti-corrosion material is sodium nitrite.

10. A method as recited in claim 6, further comprising the steps of:
selecting at least one additive selected from the group of additives consisting of a biocide, a defoamer, and a dispersant; and
adding the at least one selected additive to the texture material.

11. A system for dispensing texture material in an orange peel pattern, comprising:
an aerosol dispenser comprising
a container assembly formed at least in part of tin-plated steel,
a valve assembly that controls flow of pressurized fluid out of the container assembly, and
an outlet assembly that alters a cross-sectional area of an outlet opening through which pressurized fluid flowing out of the container assembly through the valve assembly passes;
a contained material comprising
texture material, where the texture material comprises approximately 2-10% by weight of latex binder,
approximately 43-63% by weight of fillers,
approximately 2-12% by weight of drier accelerant, and
water as a solvent/carrier;
a propellant material, where the contained material comprises
approximately 5-20% by weight of the propellant material;
wherein
the contained material is disposed within the container assembly;
the outlet assembly is operated to alter the cross-sectional of the outlet opening such that the cross-sectional area of the outlet opening corresponds to a desired orange peel texture pattern;
the valve assembly is operated to allow the propellant material to force at least a portion of the texture material out of the outlet opening in a spray pattern corresponding to the desired orange peel texture pattern; and
the drier accelerant promotes drying of the dispensed texture material in the desired orange peel texture pattern.

12. A system as recited in claim 11, in which the drier accelerant comprises at least one material selected from the group of materials comprising tetrahydrofuran, acetone, methanol, iso-propanol, ethanol, N-propanol, propylene glycol monomethylether, propylene glycol n-propyl ether, diethylene glycol monomethyl ether, diacetone alchohol, ethylene glycol monobutyl ether, N-methyl pyrrolidone, dipropylene glycol methyl ether, diethanolamine, diethylene glycol monethyl ether, diethylene glycol, methyl ethyl ketone, and methyl acetate.

13. A system as recited in claim 11, further comprising:
a first anti-corrosion material; and
a second anti-corrosion material; wherein
the amount of the first anti-corrosion material is selected with respect to the second anti-corrosion material to promote formation of a thin protective film on any portion of the container assembly made of tin-plated steel.

14. A system as recited in claim 13, in which:
the first anti-corrosion material comprises approximately 0.1-5% by weight of the texture material, where the first anti-corrosion material is a phosphate ester, and
a second anti-corrosion material comprises approximately 0.025-2.0% by weight of the texture material, where the second anti-corrosion material is sodium nitrite.

15. A system as recited in claim 11, further comprising at least one additive selected from the group of additives consisting of a biocide, a defoamer, and a dispersant.

16. A system as recited in claim 11, in which the texture material comprises approximately 19-39% by weight of water.

17. A system as recited in claim 11, in which the texture material comprises approximately 48-58% by weight of fillers.

18. A system as recited in claim 11, in which the contained material comprises approximately 10-15% by weight of the propellant material.

19. A system as recited in claim 11, in which the texture material comprises:
approximately 19-39% by weight of water, and
approximately 48-58% by weight of fillers.

* * * * *